United States Patent [19]
Holliday

[11] 3,959,904
[45] June 1, 1976

[54] MICROFICHE STORAGE UNIT

[75] Inventor: Robert G. Holliday, Ann Arbor, Mich.

[73] Assignee: Xerox Corporation, Stamford, Conn.

[22] Filed: Nov. 4, 1974

[21] Appl. No.: 520,652

[52] U.S. Cl. ............................... 40/102; 40/124.2; 40/104.08
[51] Int. Cl.² .................................... G09F 11/06
[58] Field of Search ............... 40/102, 124.2, 158 B, 40/159, 104.03, 104.08, 104.17–104.19; 274/47; 206/313; 211/40, 60 T; 15/231

[56] References Cited
UNITED STATES PATENTS

| | | | |
|---|---|---|---|
| 1,611,333 | 12/1926 | Butler | 40/104.08 |
| 3,535,806 | 10/1970 | Tucker | 40/124.2 |
| 3,633,761 | 1/1972 | Holliday | 15/231 X |

Primary Examiner—Louis G. Mancene
Assistant Examiner—John H. Wolff

[57] ABSTRACT

A microfiche unit for storing and cleaning microfiche cards or sheets. A pair of hingedly connected covers capable of being opened into a common plane are provided with a plurality of terraced pockets on their inner surfaces. Cleaning elements are secured to the exposed edges of the pockets for wiping contact with the microfiche during their insertion and removal.

8 Claims, 7 Drawing Figures

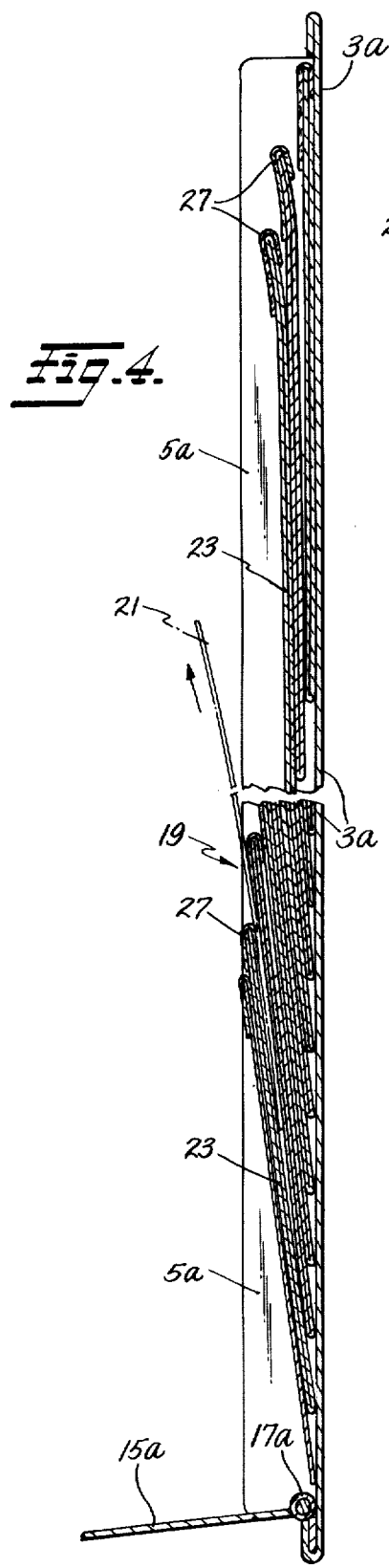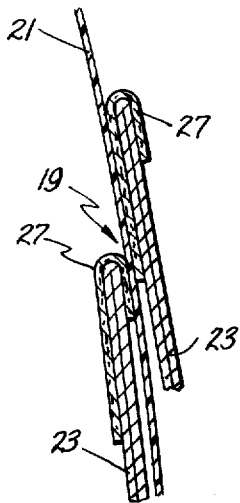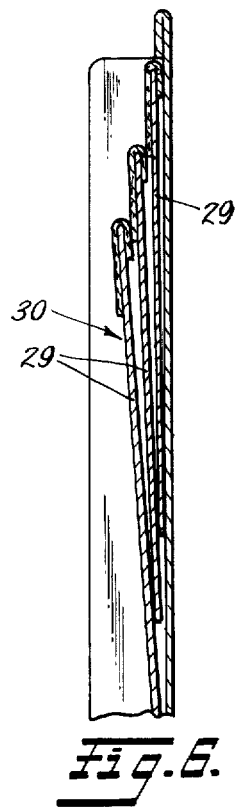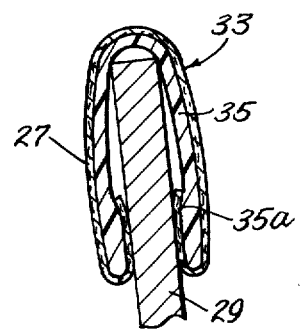

MICROFICHE STORAGE UNIT

BACKGROUND OF THE INVENTION

The present invention relates to a file or storage unit for storing and cleaning microfiche cards or sheets that is adapted for use in conjunction with a microfiche reader apparatus. Conventional or known prior art microfiche storage units exist in many forms. The utilization of simple file boxes for storing microfiche is particularly well known. A more sophisticated version of prior art microfiche storage units is exemplified by the Hutchison U.S. Pat. No. 3,782,013 wherein a plurality of shingled pocket members suprimposed upon a series of backing sheets are used for indexing the individual microfiche. Another example of a microfiche storage unit is disclosed by the Holliday U.S. Pat. No. 3,633,761 wherein the storage unit is in the form of a vertical column of individual storage sections with the entire unit being mounted on a turntable base to facilitate access to the individual storage spaces. The Holliday device also includes replaceable elements mounted in the top of the storage unit for the purpose of cleaning the microfiche. However, notwithstanding the variety of simple and sophisticated known prior art microfiche storage devices, such devices are possessed of certain individual disadvantages which do not permit the overall storage and retrieval of microfiche in an efficient manner while simultaneously safely maintaining the microfiche in a flat and clean condition. Further, because of the structural characteristics of microfiche cards or sheets made of plastic material, they have a strong tendency to attract debris, dust or lint which must be thoroughly cleaned from each microfiche prior to its use with a microfiche reader. This cleaning requirement has heretofore not been satisfactorily accomplished by known microfiche storage devices.

SUMMARY OF THE INVENTION

The microfiche storage unit of the present invention serves to overcome the disadvantages and shortcomings of known prior art microfiche storage units by providing a storage unit which permits an extremely compact storage of a relatively large number of microfiche cards and the insertion or removal of the individual cards from the storage unit in a highly efficient manner. The storage unit of the present invention also serves to maintain and store the individual microfiche cards in a flat condition, as well as providing for the thorough and efficient cleaning of each individual card during its insertion into or removal from the storage unit.

In the preferred embodiment of the present invention, the microfiche storage unit comprises two covers which are hingedly secured together to open into a common plane and close in the basic manner of a book. The inner surfaces of the covers, in their closed position, are provided with a plurality of terraced or shingled pockets formed by incorporating a plurality of overlapping folds within two continuous lengths of flexible material and thereafter securing the folded strips to the cover surfaces. The open folded edges of each terraced pocket is provided with a strip of flexible cleaning material folded over and secured to each pocket edge such that adjacent strips are in abutting contact with each other to form a wiper or cleaning element that thoroughly cleans both sides of a microfiche card simultaneously during its insertion into or removal from a pocket.

It is an object of the present invention to provide for an improved microfiche storage unit which is extremely compact and capable of storing a relatively large number of microfiche.

It is another object of the present invention to provide for an improved microfiche storage unit which permits the storage of a relatively large number of microfiche in a flat manner so that the structural integrity of each microfiche is maintained in a safe condition during storage.

It is still another object of the present invention to provide for an improved microfiche storage unit which permits the effficient storage and retrieval of a relatively large number of microfiche.

It is yet a further object of the present invention to provide for an improved microfiche storage unit which automatically and thoroughly cleans each individual microfiche during its insertion into or removal from the storage unit.

These and other objects of the present invention will be apparent from the following description and appended claims, reference being made to the accompanying drawings forming a part of this specification wherein like reference characters designate corresponding parts in the several views.

BRIEF DESCRIPTION OF THE DRAWINGS

FIG. 4 is an enlarged fragmentary vertical sectional view taken along the line 4—4 of FIG. 1;

FIG. 5 is an enlarged fragmentary vertical sectional view depicting in detail the arrangement of the cleaning elements secured to the exposed edges of two adjacent pocket walls with a microfiche card inserted therebetween;

FIG. 6 is a fragmentary vertical sectional view depicting a modification of the storage pocket structure as shown in FIGS. 4 and 5; and FIG. 7 is an enlarged fragmentary vertical sectional view of a modified form of the cleaning element mounted on the edge of a storage pocket wall.

DESCRIPTION OF THE PREFERRED EMBODIMENTS

Figure 1:
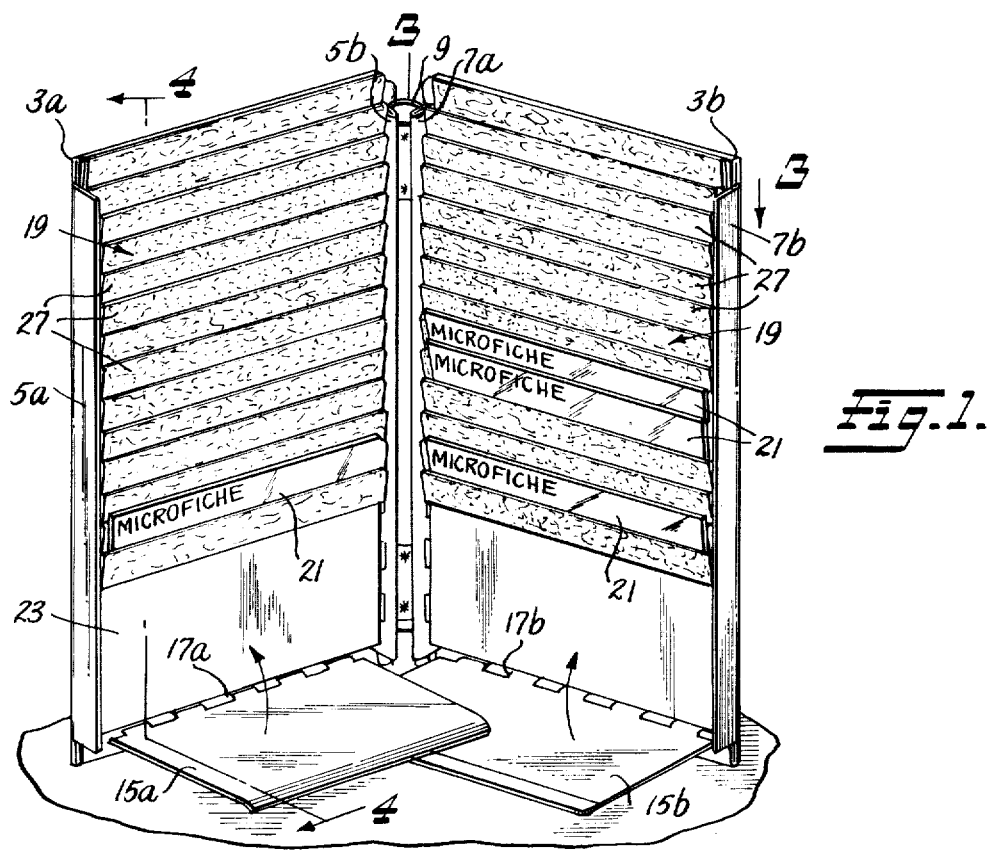
FIG. 1 is a pictorial view of the microfiche storage unit of the present invention in its open position of use.
Figure 2:
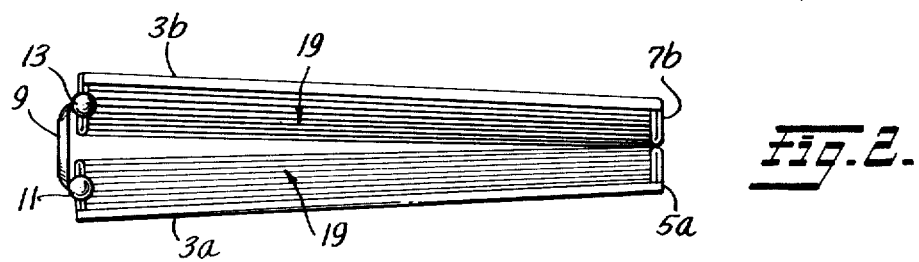
FIG. 2 is a plan view of the storage unit of FIG. 1 in a closed position.

The improved microfiche storage unit 1 of the present invention as shown in FIGS. 1 and 2 comprises a pair of substantially rectangular-shaped flat covers 3a and 3b. Cover 3a is provided with a pair of parallel flanges 5a and 5b along its longitudinal edges. Similarly, cover 3b is provided with a pair of parallel flanges 7a and 7b along its longitudinal edges. A backing strip 9 hingedly secures covers 3a and 3b together by means of pintles 11 and 13 such that covers 3a and 3b may be opened to form a common plane and closed in the basic manner of a book. A pair of rigid flaps 15a and 15b for assisting the support of partially opened covers 3a and 3b in an upright position may optionally be secured adjacent the bottom portions of covers 3a and 3b by means of hinges 17a and 17b for approximately 90° pivotal action between a vertical and horizontal position. As is evidenced in FIG. 1, flaps 15a and 15b may overlap to a certain degree in their horizontal position when covers 3a and 3b are in a partially open position.

Secured to the inner surfaces of covers 3a and 3b are a plurality of terraced or shingled pockets 19 for receiving and storing microfiche cards 21 or similar sheet material.

Figure 3:
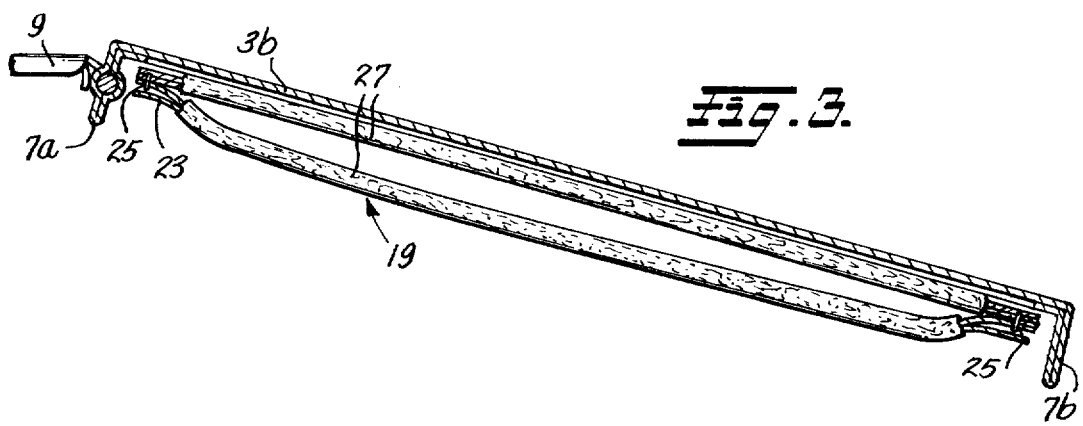
FIG. 3 is an enlarged fragmentary horizontal sectional view, taken substantially on the line 3—3 of FIG. 1 showing one of the upper compartments of the storage unit in a slightly expanded condition.

Referring more particularly to FIGS. 3 and 4, pockets 19 are formed by folding a continuous length or strip 23 of paper or similar flexible material in an overlapping fashion or relationship, as best seen in FIG. 4. The folded strip 23 is secured at spaced intervals along its two longitudinal edges with staples 25 or similar fastening means, each of which serve to connect pairs of adjacent folds together, such that the entire unit may be expanded in an accordion fashion and each fold forms one wall section of a pocket.

The assembled folded strips 23 are then secured by adhesive or similar suitable fastening means to the inner surfaces of covers 3a and 3b such that corresponding pairs of parallel flanges 5a and 5b, 7a and 7b serve to enclose and protect the longitudinal edge portions of strips 23 when covers 3a and 3b are in a closed position.

The upper exposed edges of pockets 19 are each provided with a strip 27 of suitable cleaning material. Strip 27 may be of cloth, felt, velvet or any such similar material useful for removing lint, debris and dust from the surfaces of microfiche cards without damage thereto and may or may not be treated with chemical agents for facilitating the cleaning action. One suitable cloth which may be used for this purpose can be selected from the cloths sold by FilMagic/Distributors Group, Inc., 201 14th Street, N.W., Atlanta, Georgia 30318, under the trademark FilMagic Cloths, which are silicone treated cloths. While the use of chemically treated cloths or cleaning material are advantageous to the practice of this invention, it is to be understood that untreated cloths or similar cleaning material may also be utilized.

As is evident in FIG. 5, cleaning strips 27 may be attached to the upper edges of the walls of pockets 19 by folding the strips over the edges and securing them in place with adhesive or other suitable attachment means such that portions of strips 27 secured to adjacent wall sections are in abutting contact with each other along their entire lengths throughout the terrace of pockets. Thus, as is further evident in FIG. 5, when a microfiche card 21 is either inserted into or removed from a given pocket 19, it is thoroughly wiped clean by the abutting sections of adjacent strips 27 corresponding to that pocket.

A second embodiment of the manner in which the pockets of the microfiche storage unit of the present invention may be formed is depicted in FIG. 6. In this case, instead of utilizing a folded continuous strip 23 as shown in FIG. 4, a plurality of individual sheet sections 29 are arranged in overlapping relationship and secured together along their edges in the same basic manner as indicated for continuous strip 23. The assembled unit of terraced pockets 30 may then be secured to the internal surfaces of covers 3a and 3b in the same manner as previously indicated for folded continuous strip 23.

FIG. 7 depicts an alternative embodiment for the cleaning strip 27 as depicted in FIG. 5. In this case, the strips are in the form of removable cleaning elements 33 which include a base member 35 formed by extruding suitable organic plastic material, such as high impact styrene, so that the extrudate or base member 35 will have a cross-section of a relatively flat C-shape with inwardly facing shoulders 35a at the opening of the "C" for pressing and retaining cleaning element 33 on the edge of each pocket wall 29. The base member 35 is covered with the same cleaning material 27 as indicated previously. In this manner, cleaning element 33 may be removed when worn from individual pocket walls and replaced with fresh elements as needed. While FIG. 7 depicts cleaning element 33 used in conjunction with the single sheet pocket wall 29 of FIG. 6, it is to be understood that elements 33 may also be utilized with the folded pocket wall construction of folded strip 23 as shown in FIG. 5.

As is apparent from the foregoing disclosure, the improved microfiche storage unit 1 of the present invention provides for individual storage space for a large number of microfiche cards 21 or similar sheet material. With the flaps 15a and 15b in their closed vertical condition, covers 3a and 3b can be pivoted together like a book so that the entire storage unit forms a small compact package that is easily portable. Further, a large number of these units in their folded condition can be placed along a standard bookshelf for efficient storage. The rigid outer covers 3a and 3b, along with rigid flaps 5a and 5b serve to add strength to the entire unit and protect the microfiche cards contained therein against damage. In use, covers 3a and 3b may be quickly opened in the manner of a book and the desired microfiche cards may be removed, after which covers 3a and 3b may be reclosed. When it is desired to utilize the storage unit for a prolonged period of time in conjunction with a microfiche reader, the covers 3a and 3b are opened to an angle of approximately 100° to 120° and the respective flaps 15a and 15b are pivoted to their horizontal overlapping positions. In this manner, storage unit 1 may then be placed in an upright position, as depicted in FIG. 1, so that the user may conveniently select the desired cards for removal and replacement, during which acts the cards are individually and thoroughly cleaned by strips 27 or cleaning elements 33. The sizes of individual pockets 19 or 30 may obviously be made to correspond to the size of the microfiche card being stored. As is apparent in FIG. 1, cards 21 may be provided with indicia at their upper edges such that after full insertion into pockets 19, the indicia will be visible for identification purposes.

It is preferable that covers 3a and 3b, as well as flaps 5a and 5b, be made of rigid material such as metal, plastic, cardboard or the like. The pockets are desirably made of flexible material such as paper, thin plastic or the like, though rigid material may also be used to advantage.

It is to be understood that the forms of the invention herewith shown and described is to be taken as preferred examples of the same, and that various changes in the shape, size and arrangement of parts may be resorted to, without departing from the spirit of the invention or scope of the subjoined claims.

What is claimed is:

1. A storage unit for microfiche which unit comprises, in combination:

A. a pair of covers hingedly secured together for opening into a common plane formed by adjacent surfaces of the covers;

B. A plurality of terraced pockets having upper exposed edges secured to the adjacent surfaces of the covers forming the common plane for receiving and storing microfiche; and C. cleaning means secured to the exposed edges of the terraced pockets for wiping contact with both sides of a microfiche simultaneously as it is inserted into and removed from any of the pockets.

2. The storage unit of claim 1 wherein the terraced pockets are formed from a continuous length of flexible material, folded and secured together in overlapping relationship.

3. The storage unit of claim 1 wherein the terraced pockets are formed from a plurality of individial sheets of material secured together in overlapping relationship.

4. The storage unit of claim 1 wherein the cleaning means includes a flexible strip of material secured around exposed edge of each terraced pocket such that adjacent strips of material are in abutting contact with each other.

5. The storage unit of claim 1 wherein the cleaning means includes a removable C-shaped base member enclosing the exposed edge of each terraced pocket, with a strip of flexible material secured each base member such that adjacent strips of material are in abutting contact with each other.

6. The storage unit of claim 1 wherein the cleaning means includes a chemical agent for facilitating the cleaning of the microfiche.

7. The storage unit of claim 6 wherein the chemical agent is silicone.

8. The storage unit of claim 1 wherein the covers further include parallel flanges for enclosing and protecting the terraced pockets.

* * * * *